(12) United States Patent
Fan et al.

(10) Patent No.: US 12,532,289 B2
(45) Date of Patent: Jan. 20, 2026

(54) LOCATION CALIBRATION METHOD AND DEVICE

(71) Applicant: BEIJING UNISOC COMMUNICATIONS TECHNOLOGY CO., LTD., Beijing (CN)

(72) Inventors: Huifang Fan, Beijing (CN); Xiangxin Gu, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 414 days.

(21) Appl. No.: 18/005,043

(22) PCT Filed: Jul. 9, 2021

(86) PCT No.: PCT/CN2021/105391
§ 371 (c)(1),
(2) Date: Jan. 10, 2023

(87) PCT Pub. No.: WO2022/007923
PCT Pub. Date: Jan. 13, 2022

(65) Prior Publication Data
US 2023/0337177 A1    Oct. 19, 2023

(30) Foreign Application Priority Data
Jul. 10, 2020  (CN) .......................... 202010663461.2

(51) Int. Cl.
*H04W 64/00* (2009.01)
*H04W 4/029* (2018.01)

(52) U.S. Cl.
CPC ......... *H04W 64/003* (2013.01); *H04W 4/029* (2018.02)

(58) Field of Classification Search
CPC ... H04W 64/003; H04W 4/029; H04W 64/00; Y02D 30/70; G01S 5/0236; G01S 5/021
See application file for complete search history.

(56) References Cited

U.S. PATENT DOCUMENTS

| 6,230,018 B1 | 5/2001 | Watters et al. |
| 2007/0100549 A1 | 5/2007 | Kawakami et al. |

(Continued)

FOREIGN PATENT DOCUMENTS

| CN | 102958155 A | 3/2013 |
| CN | 104796980 A | 7/2015 |

(Continued)

OTHER PUBLICATIONS

International Search Report and Written Opinion received in the corresponding International Application PCT/CN2021/105391, mailed Sep. 28, 2021.

(Continued)

*Primary Examiner* — Marcos L Torres
(74) *Attorney, Agent, or Firm* — Kilpatrick Townsend & Stockton LLP (57) ABSTRACT

Embodiments of the present disclosure provide a location calibration method and device. A terminal device first receives a location assistance message sent by a location server, where the location assistance message includes location calibration information. Then, the terminal device determines a target location calibration value corresponding to the terminal device in the location calibration information according to currently determined terminal location information, and calibrates the currently determined terminal location information based on the target location calibration value.

9 Claims, 3 Drawing Sheets

(56) References Cited

U.S. PATENT DOCUMENTS

| | | | |
|---|---|---|---|
| 2018/0246219 A1* | 8/2018 | Zhang | .................... H04W 4/02 |
| 2018/0246220 A1 | 8/2018 | Zhang et al. | |
| 2020/0174135 A1 | 6/2020 | Gong | |
| 2022/0179097 A1* | 6/2022 | Gunnarsson | .......... G01S 19/252 |

FOREIGN PATENT DOCUMENTS

| | | |
|---|---|---|
| CN | 106998535 A | 8/2017 |
| CN | 109143156 A | 1/2019 |
| CN | 110770601 A | 2/2020 |
| WO | 2006022324 A1 | 3/2006 |
| WO | 2017071650 A1 | 5/2017 |

OTHER PUBLICATIONS

First Office Action received in the corresponding Chinese Application 202010663461.2, mailed Apr. 29, 2022.
Second Office Action received in the corresponding Chinese Application 202010663461.2, mailed Nov. 10, 2022.
Nokia et al., "RTK GNSS positioning enhancement", 3GPP TSG-RAN WG2 #99, R2-1709559, 2Berlin, Germany, Aug. 21-25, 2017.
Supplementary European Search Report of EP 21838251.3 Dated Dec. 14, 2023.

* cited by examiner

FIG. 6

LOCATION CALIBRATION METHOD AND DEVICE

This application is a National Stage of International Application No. PCT/CN2021/105391, filed on Jul. 9, 2021, which claims priority to China Patent Application No. 202010663461.2, filed on Jul. 10, 2020, in China National Intellectual Property Administration and entitled "LOCATION CALIBRATION METHOD AND DEVICE FOR TERMINAL DEVICE", both of which are hereby incorporated by reference in their entireties.

TECHNICAL FIELD

Embodiments of the present disclosure relate to the technical field of mobile communication, and particularly to a location calibration method and device.

BACKGROUND

Currently, with the constant development of mobile communication technology, the demand for location-based service has also increased, and thus researches on location technologies have attracted more and more attention.

A location technology is used for determining a geographical location of a terminal device, and may directly or indirectly obtain location information of the terminal device by use of a resource of a wireless communication network. Common location technologies include Observed Time Difference of Arrival (OTDOA), Uplink Time Difference of Arrival (UTDOA), Enhanced Cell Identifier (E-CID), etc.

SUMMARY

Embodiments of the present disclosure provide a location calibration method and device.

In a first aspect, an embodiment of the present disclosure provides a location calibration method, including:
  receiving, by a terminal device, location assistance message sent by a location server, where the location assistance message includes location calibration information;
  obtaining, by the terminal device, currently determined terminal location information, and determining a target location calibration value corresponding to the terminal device in the location calibration information according to the terminal location information;
  and calibrating, by the terminal device, the terminal location information according to the target location calibration value to obtain calibrated terminal location information.

In a second aspect, an embodiment of the present disclosure provides a location calibration method, including:
  sending, by a location server, location assistance message to a terminal device, where the location assistance message includes location calibration information,
  the location calibration information is used for the terminal device to determine a target location calibration value corresponding to the terminal device according to determined terminal location information and calibrate the terminal location information according to the target location calibration value to obtain calibrated terminal location information.

In a third aspect, an embodiment of the present disclosure provides a terminal device, including at least one processor and a memory, where the memory stores a computer-executable instruction; and the at least one processor executes the computer-executable instruction stored in the memory to enable the at least one processor to execute the location calibration method as described in the first aspect.

In a fourth aspect, an embodiment of the present disclosure provides a computer-readable storage medium, storing a computer-executable instruction, a processor, when executing the computer-executable instruction, implements the location calibration method as described in the first aspect.

According to the location calibration method and device provided in the embodiments of the present disclosure, a terminal device receives a location assistance message sent by a location server, where the location assistance message includes location calibration information; and the terminal device determines a target location calibration value corresponding to the terminal device in the location calibration information according to currently determined terminal location information, and calibrates the currently determined terminal location information based on the target location calibration value.

BRIEF DESCRIPTION OF THE DRAWINGS

In order to describe the technical solutions in the embodiments of the present disclosure or the related art more clearly, the drawings required to be used in descriptions about the embodiments or the related art will be briefly introduced below. Apparently, the drawings in the description below are some embodiments of the present disclosure. Other drawings may further be obtained by those of ordinary skill in the art according to these drawings without creative work.

DESCRIPTION OF EMBODIMENTS

In order to make the objectives, technical solutions, and advantages of the embodiments of the present disclosure clearer, the technical solutions in the embodiments of the present disclosure will be described clearly and completely below in combination with the drawings in the embodiments of the present disclosure. Clearly, the described embodiments are not all but part of embodiments of the present disclosure. All other embodiments obtained by those of ordinary skill in the art based on the embodiments in the present disclosure without creative work shall fall within the scope of protection of the present disclosure.

The embodiments of the present disclosure may be applied to various communication systems, such as an Advanced Long Term Evolution (LTE-A) system, a New Radio (NR) system, an evolved system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a next-generation communication system, or another communication system.

Generally speaking, connections supported by a communication system are limited in number and also easy to implement. However, with the development of communication technologies, a mobile communication system will not only support current communication but also support, for example, Device to Device (D2D) communication, Machine to Machine (M2M) communication, Machine Type Communication (MTC), and Vehicle to Vehicle (V2V) communication. The embodiments of the present disclosure may also be applied to these communication systems.

Figure 1:
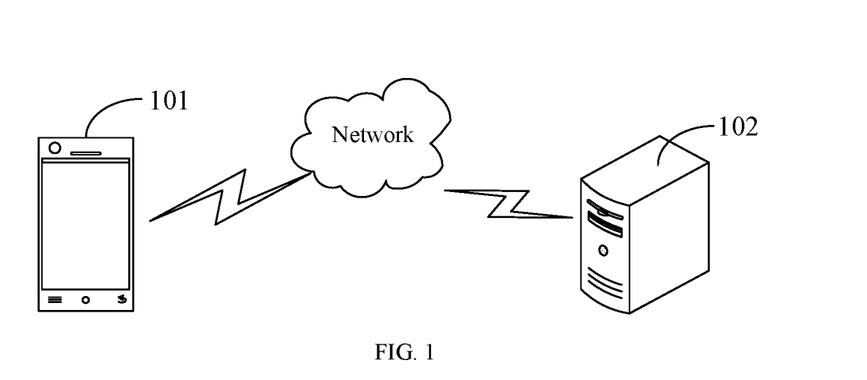
FIG. 1 is a schematic architectural diagram of a wireless communication system according to an embodiment of the present disclosure.

Referring to FIG. 1, FIG. 1 is a schematic architectural diagram of a wireless communication system according to an embodiment of the present disclosure. The wireless communication system provided in the present embodiment includes a terminal device 101 and a network device 102.

In an embodiment, the terminal device 101 may refer to user equipment, an access terminal, a user unit, a user station, a mobile radio station, a Mobile Station (MS), a remote station, a remote terminal, a mobile device, terminal equipment, a wireless communication device, a user agent, or a user device. The terminal device may also be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle device, a wearable device, a terminal device in a future 5th Generation (5G) network, a terminal device in a future evolved Public Land Mobile Network (PLMN), etc. No limits are made thereto in the embodiment of the present disclosure.

In an embodiment, the network device 102 may be a location center, a core network element. The location server may be a physical or logical entity that manages location of terminal devices by measurement and other location information, such as a Location Management Function (LMF) entity, a Secure User Plane Location (SUPL) platform, and an Evolved-Serving Mobile Location Center (E-SMLC). In order to complete location of a terminal device, the location server may provide some assistance data for the terminal device to assist the terminal device in completing location.

Currently, common location requirements of a terminal device are generally divided into two major scenarios: a general business scenario and an Industrial Internet of Things (IIoT) scenario. Location accuracy required by the general business scenario is usually less than 1 m. Location accuracy required by the IIoT scenario is less than 0.2 cm. Therefore, as requirements of users for the accuracy of location technologies increase, it is necessary to further enhance the location accuracy of location technologies to improve the location accuracy of terminal devices.

In order to solve the foregoing technical problems, in the present disclosure, a terminal device calibrates determined terminal location information of the terminal device based on location calibration information sent by a location server, whereby the location accuracy of the terminal device may be improved. Descriptions will be made below with specific embodiments.

Figure 2:
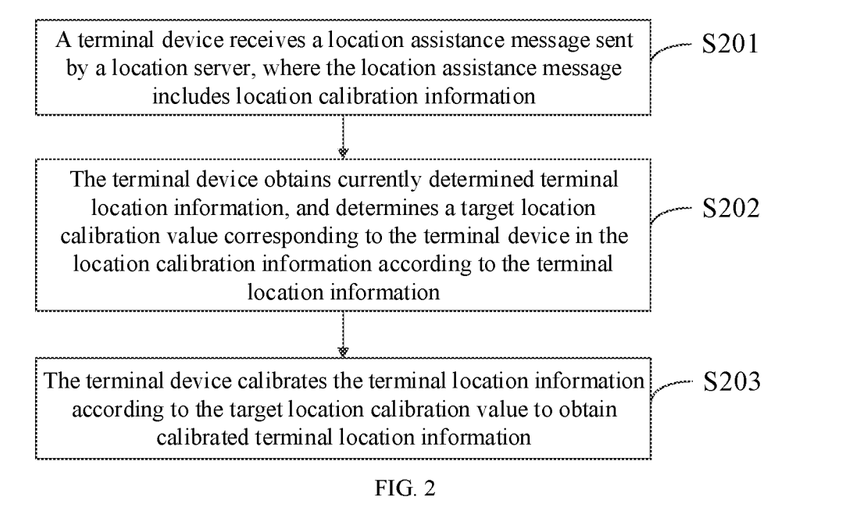
FIG. 2 is a schematic flowchart of a location calibration method according to an embodiment of the present disclosure.

Referring to FIG. 2, FIG. 2 is a schematic flowchart of a location calibration method according to an embodiment of the present disclosure. The location calibration method includes the following steps.

In S201, a terminal device receives a location assistance message sent by a location server, where the location assistance message includes location calibration information.

In the embodiment of the present disclosure, a location server may send a location assistance message to a terminal device with a location requirement, the location assistance message includes location calibration information predetermined by the location server.

In an embodiment, an LMF may obtain location calibration information by Operation Administration and Maintenance (OAM) or based on historical terminal location information, and no limits are made thereto in this solution.

In an embodiment, the location assistance message may further include a Physical Cell Identifier (PCI)/Global Cell Identity (GCI), a Transmission and Receiving Point Identifier (TRP ID), a Down Link-location Reference Signal (DL-PRS) configuration (config)/spatial information (Spatial info), a Synchronization Signal and Physical Broadcast Channel (PBCH) Block (SSB), and other information.

In S202, the terminal device obtains currently determined terminal location information, and determines a target location calibration value corresponding to the terminal device in the location calibration information according to the terminal location information.

In the embodiment of the present disclosure, the terminal device, after receiving the location calibration information, obtains currently determined terminal location information of the terminal device itself, then finds a location calibration value matched with the terminal location information from the location calibration information, and determines the location calibration value as a target location calibration value corresponding to the terminal device.

It can be understood that the location server may measure and determine location calibration values corresponding to multiple pieces of reference location information in advance, and then send a correspondence between each piece of reference location information and each location calibration value to the terminal device as the location calibration information. The terminal device, after obtaining the currently determined location information of the terminal device itself, searches each piece of reference location information in the location calibration information for target reference location information matched with the terminal location information, and then determines the location calibration value corresponding to the target reference location information according to the correspondence between each piece of reference location information and each location calibration value to further obtain the target location calibration value corresponding to the terminal device.

In S203, the terminal device calibrates the terminal location information according to the target location calibration value to obtain calibrated terminal location information.

In the embodiment of the present disclosure, after the target location calibration value corresponding to the terminal device is determined, a terminal location in the terminal location information may be calibrated based on the determined target location calibration value to obtain calibrated terminal location information.

Figure 3:
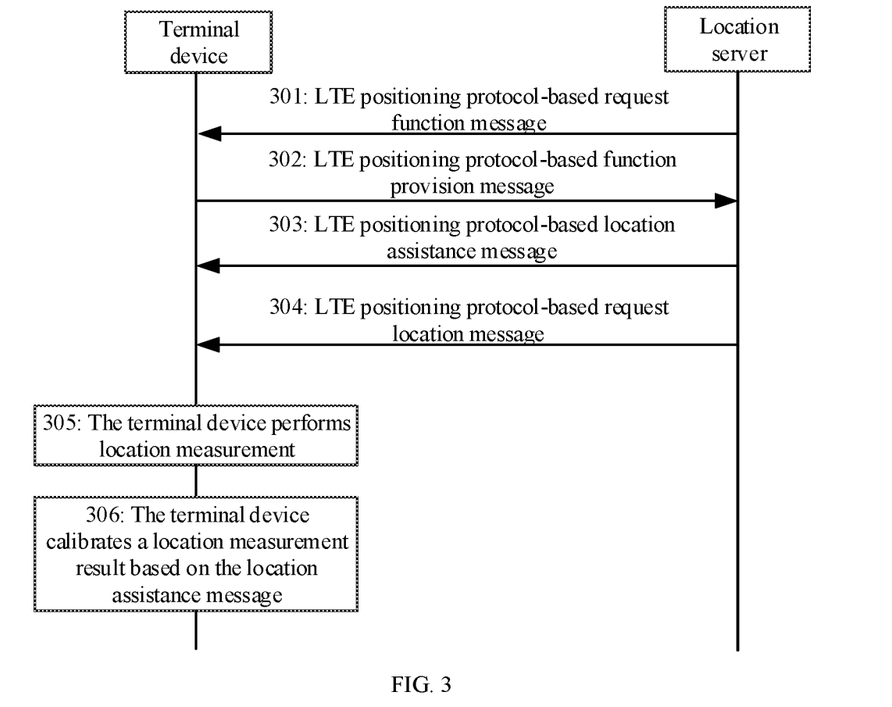
FIG. 3 is a schematic diagram of signaling interaction between a terminal device and a location server according to an embodiment of the present disclosure.

In order to understand the embodiment of the present disclosure better, references are made to FIG. 3. FIG. 3 is a schematic diagram of signaling interaction between a terminal device and a location server according to an embodiment of the present disclosure.

In the embodiment of the present disclosure, the location calibration method includes the following steps.

In 301, the location server sends LTE Positioning Protocol (LPP)-based request function message (LPP request capabilities) to the terminal device.

In 302, the terminal device feeds back LTE Positioning Protocol-based function provision message (LPP provide capabilities) to the location server.

In 303, the location server sends LTE Positioning Protocol-based location assistance message (LPP provide assistance data) to the terminal device.

In 304, the location server sends LTE Positioning Protocol-based request location message (LPP request location information) to the terminal device.

In 305, the terminal device performs location measurement.

In an embodiment, the terminal device performs location measurement according to the location assistance message sent by the location server, and determines the terminal location information according to a location measurement result.

In 306, the terminal device calibrates a location result based on location calibration information in the location assistance message.

In an embodiment, the location calibration information includes at least one piece of reference location information and a location calibration value corresponding to each piece of reference location information.

When determining a target location calibration value, the terminal device may first determine target reference location information from the at least one piece of reference location information according to the terminal location information, and then determine the location calibration value corresponding to the target reference location information as the target location calibration value corresponding to the terminal device.

In an embodiment, the location calibration information may be sent to the terminal device in a table form.

In order to understand the embodiment of the present disclosure better, references are made to Table 1. Table 1 is location calibration information table 1 provided in the embodiment of the present disclosure.

TABLE 1

Location Calibration Information Table 1

| Reference location information | Location calibration value |
|---|---|
| Reference location information 1 | Location calibration value 1 |
| Reference location information 2 | Location calibration value 2 |
| Reference location information 3 | Location calibration value 3 |
| Reference location information 4 | Location calibration value 4 |

Illustratively, if the currently determined terminal location information of the terminal device itself is terminal location information A, and the location calibration information table is looked up to determine that reference location information 2 is matched with terminal location information A, it may be determined that the target location calibration value corresponding to the terminal device is location calibration value 2.

According to the location calibration method provided in the embodiment of the present disclosure, the location assistance message sent to the terminal device by the location server when the terminal device is located includes the location calibration information, and the location calibration information includes the at least one piece of reference location information and the location calibration value corresponding to each piece of reference location information. Therefore, the terminal device, after obtaining the currently determined terminal location information, may determine the target location calibration value corresponding to the terminal device in the location calibration information according to the obtained terminal location information, and further calibrate the currently determined terminal location information of the terminal device, improving the location accuracy of the terminal device.

Based on the contents described in the above-mentioned embodiment, in another possible implementation mode of the present disclosure, each piece of reference location information includes at least one of the following information: a location region and location configuration information.

In an embodiment, each location region corresponds to one or more pieces of location configuration information.

In an embodiment, each piece of reference location information includes a location region and a piece of location configuration information, and each piece of reference location information corresponds to a unique location calibration value.

In an embodiment, the location region is a location region of a preset length, a preset width, and a preset height, which may specifically be configured reasonably according to the location accuracy required by a location method.

Figure 4:
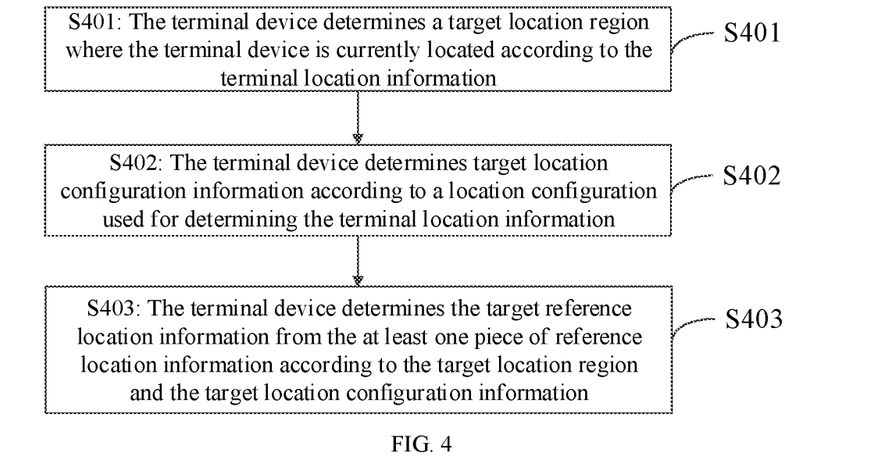
FIG. 4 is a schematic sub-flowchart of a location calibration method according to an embodiment of the present disclosure.

Referring to FIG. 4, FIG. 4 is a schematic sub-flowchart of a location calibration method according to an embodiment of the present disclosure. The operation that target reference location information is determined from the at least one piece of reference location information according to the terminal location information includes the following steps.

In S401, the terminal device determines a target location region where the terminal device is currently located according to the terminal location information.

In S402, the terminal device determines target location configuration information according to a location configuration used for determining the terminal location information.

In S403, the terminal device determines the target reference location information from the at least one piece of reference location information according to the target location region and the target location configuration information.

In order to understand the embodiment of the present disclosure better, references are made to Table 2. Table 2 is location calibration information table 2 provided in the embodiment of the present disclosure.

TABLE 2

Location Calibration Information Table 2

| | Reference location information | Location calibration value |
|---|---|---|
| Location region 1 | Location configuration information 1 | Location calibration value 1 |
| | Location configuration information 2 | Location calibration value 2 |
| | Location configuration information 3 | Location calibration value 3 |
| Location region 2 | Location configuration information 1 | Location calibration value 4 |
| | Location configuration information 2 | Location calibration value 5 |
| | Location configuration information 3 | Location calibration value 6 |
| Location region 3 | Location configuration information 1 | Location calibration value 7 |
| | Location configuration information 2 | Location calibration value 8 |
| Location region 4 | Location configuration information 1 | Location calibration value 9 |

In the embodiment of the present disclosure, it is assumed that the obtained currently determined terminal location information of the terminal device is location A, and a location configuration used for locating the terminal device is location configuration information 2. In such case, when location A is in location region 1, it may be determined that the target reference location information corresponding to the terminal device is "location region 1-location configuration 2", and it may further be determined that the target location calibration value corresponding to the terminal device is location calibration value 2. When location A is in location region 2, it may be determined that the target reference location information corresponding to the terminal device is "location region 2-location configuration information 2", and it may further be determined that the target location calibration value corresponding to the terminal device is "location calibration value 5".

According to the location calibration method provided in the embodiment of the present disclosure, each piece of reference location information in the location calibration information includes at least one location region and the location configuration information corresponding to each location region. Therefore, the terminal device may determine the target location calibration value matched with the terminal device best from the location calibration information based on its own current location information and the used location configuration, further improving the location accuracy of the terminal device.

Based on the contents described in the above-mentioned embodiment, in another possible implementation mode of the present disclosure, the location configuration information includes a location method and/or a transmission and receiving point identifier.

In order to understand the embodiment of the present disclosure better, the condition that the location configuration information includes a location method and a transmission and receiving point identifier is taken as an example for description in the embodiment of the present disclosure.

Referring to Table 3, Table 3 is location calibration information table 3 provided in the embodiment of the present disclosure.

TABLE 3

Location Calibration Information Table 3

| | Reference location information | Location calibration value |
|---|---|---|
| Location region 1 | Location method 1 TRP1, TRP2, TRP3 | Location calibration value 1 |
| | Location method 1 TRP1, TRP2, TRP4 | Location calibration value 2 |
| | Location method 2 TRP1, TRP2, TRP3 | Location calibration value 3 |
| Location region 2 | Location method 1 TRP1, TRP2, TRP3 | Location calibration value 4 |
| | Location method 1 TRP1, TRP2, TRP4 | Location calibration value 5 |
| | Location method 2 TRP1, TRP2, TRP3 | Location calibration value 6 |
| Location region 3 | Location method 1 TRP1, TRP2, TRP3 | Location calibration value 7 |
| | Location method 2 TRP1, TRP2, TRP3 | Location calibration value 8 |
| Location region 4 | Location method 1 TRP1, TRP2, TRP3 | Location calibration value 9 |

In the embodiment of the present disclosure, it is assumed that the obtained currently determined terminal location information of the terminal device is location A, and when the terminal device is located, location method 1 and transmission and receiving point identifiers of TRP1, TRP2, and TRP3 are used. In such case, when location A is in location region 1, it may be determined that the target location calibration value corresponding to the terminal device is location calibration value 1, and when location A is in location region 2, it may be determined that the target location calibration value corresponding to the terminal device is location calibration value 4.

According to the location calibration method provided in the embodiment of the present disclosure, each piece of reference location information in the location calibration information includes at least one location region and the location configuration information corresponding to each location region, and the location configuration information includes the location method and/or the transmission and receiving point identifier. Therefore, the terminal device may determine the target location calibration value matched with the terminal device best from the location calibration information based on its own current location and the used location method and/or transmission and receiving point identifier, further improving the location accuracy of the terminal device.

Figure 5:
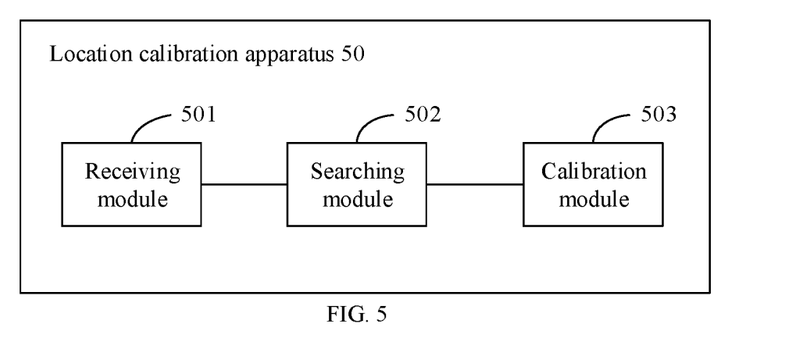
FIG. 5 is a schematic diagram of program modules of a location calibration apparatus according to an embodiment of the present disclosure.

Based on the contents described in the above-mentioned embodiment, an embodiment of the present disclosure further provides a location calibration apparatus. Referring to FIG. 5, FIG. 5 is a schematic diagram of program modules of a location calibration apparatus according to an embodiment of the present disclosure. In the embodiment of the present disclosure, the location calibration apparatus 50 includes:

a receiving module 501, configured to receive a location assistance message sent by a location server, where the location assistance message includes location calibration information;

a searching module 502, configured to obtain currently determined terminal location information, and determine a target location calibration value corresponding to a terminal device in the location calibration information according to the terminal location information; and a calibration module 503, configured to calibrate the terminal location information according to the target location calibration value to obtain calibrated terminal location information.

According to the location calibration apparatus 50 provided in the embodiment of the present disclosure, when the terminal device is located, the currently determined terminal location information of the terminal device is calibrated based on the location calibration information sent by the location server, whereby the location accuracy of the terminal device may be improved effectively.

In a possible implementation mode, the searching module 502 is specifically configured to:

perform location measurement according to the location assistance message sent by the location server, and determine the terminal location information according to a location measurement result.

In a possible implementation mode, the location calibration information includes at least one piece of reference location information and a location calibration value corresponding to each piece of reference location information.

In a possible implementation mode, the searching module 502 is specifically configured to:

determine target reference location information from the at least one piece of reference location information according to the terminal location information; and determine the location calibration value corresponding to the target reference location information as the target location calibration value corresponding to the terminal device.

In a possible implementation mode, the reference location information includes at least one of the following information: a location region and location configuration information.

In a possible implementation mode, each location region corresponds to one or more pieces of location configuration information.

In a possible implementation mode, each piece of reference location information includes a location region and a piece of location configuration information, and each piece of reference location information corresponds to a unique location calibration value.

In a possible implementation mode, the searching module 502 is specifically configured to:

determine a target location region where the terminal device is currently located according to the terminal location information;

determine target location configuration information according to a location configuration used for determining the terminal location information; and determine the target reference location information from the at least one piece of reference location information according to the target location region and the target location configuration information.

In a possible implementation mode, the location region is a location region of a preset length, a preset width, and a preset height.

In a possible implementation mode, the location configuration information includes a location method and/or a transmission and receiving point identifier.

It is to be noted that each function realized by the receiving module 501, the searching module 502, and the calibration module 503 and the principle of each function may refer to each embodiment of the location calibration method, and will not be elaborated herein.

In an embodiment, the location calibration apparatus may be a chip, a chip module, etc.

The modules in the location calibration apparatus described in the above-mentioned embodiment may be software modules, or hardware modules, or partially software modules and partially hardware modules. For example, each module in each apparatus and product applied to or integrated into a chip may be implemented by hardware such as a circuit. Alternatively, at least part of the modules may be implemented by software programs that run in a processor integrated into the chip, and the other modules (if there are) may be implemented by hardware such as circuits. Each module in each apparatus and product applied to or integrated into a chip module may be implemented by hardware such as a circuit, and different modules may be in the same component (such as a chip and a circuit module) or different components of the chip module. Alternatively, at least part of the modules may be implemented by software programs that run in a processor integrated into the chip module, and the other modules (if there are) may be implemented by hardware such as circuits. All modules in each apparatus and product applied to or integrated into a terminal may be implemented by hardware such as circuits, and different modules may be in the same component (such as a chip and a circuit module) or different components in the terminal. Alternatively, at least part of the modules may be implemented by software programs that run in a processor integrated into the terminal, and the other modules (if there are) may be implemented by hardware such as a circuit.

Further, based on the contents described in the above-mentioned embodiments, an embodiment of the present disclosure further provides a terminal device, including at least one processor and a memory. The memory stores a computer-executable instruction. The at least one processor executes the computer-executable instruction stored in the memory to implement the steps performed by the terminal device side in the above-mentioned embodiment. Elaborations are omitted in the present embodiment.

Figure 6:
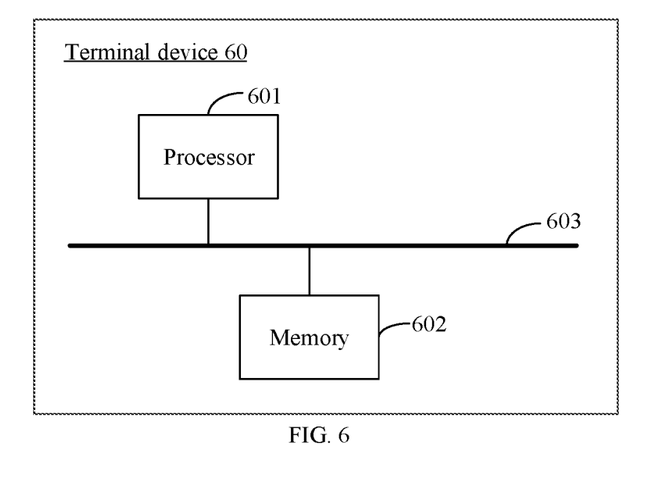
FIG. 6 is a schematic structural diagram of a terminal device according to an embodiment of the present disclosure.

In order to understand the embodiment of the present disclosure better, references are made to FIG. 6. FIG. 6 is a schematic diagram of a hardware structure of a terminal device according to an embodiment of the present disclosure.

As shown in FIG. 6, the terminal device 60 of the present embodiment includes a processor 601 and a memory 602, where the memory 602 is configured to store a computer-executable instruction; and the processor 601 is configured to execute the computer-executable instruction stored in the memory to implement each step performed by the terminal device in the above-mentioned embodiment, specifically referring to the related descriptions in the method embodiment.

In an embodiment, the memory 602 may be independent, or may be integrated with the processor 601.

When the memory 602 is arranged independently, the device further includes a bus 603, configured to connect the memory 602 with the processor 601.

Further, based on the contents described in the above-mentioned embodiments, an embodiment of the present disclosure also provides a computer-readable storage medium, storing a computer-executable instruction which, when executed by a processor, implements the steps performed by the terminal device side in the above-mentioned embodiment.

In some embodiments provided in the present disclosure, it is to be understood that the disclosed device and method may be implemented in other manners. For example, the device embodiment described above is only schematic. For example, division of the modules is only logic function division, and other division manners may be used in practical implementation. For example, multiple modules may be combined or integrated into another system, or some characteristics may be neglected or not executed. In addition, coupling or direct coupling or communication connection between each displayed or discussed component may be indirect coupling or communication connection, implemented through some interfaces, of the apparatus or the modules, and may be electrical and mechanical or use other forms.

The modules described as separate parts may or may not be physically separated. Parts displayed as modules may or may not be physical units, namely they may be located in the same place or distributed to multiple network units. Part or all of the modules may be selected as practically required to achieve the objective of the solution of the present embodiment.

In addition, each function module in each embodiment of the present disclosure may be integrated into a processing unit. Alternatively, each module may physically exist independently. Alternatively, two or more than two modules may be integrated into a unit. The integrated module may be implemented in a hardware form, or in form of a hardware and software function unit.

The integrated module implemented in form of a software function module may be stored in a computer-readable storage medium. The software function module is stored in a storage medium, including a plurality of instructions for enabling a computer device (which may be a personal computer, a server, a network device, etc.) or a processor to execute part of the steps of the method in each embodiment of the present disclosure.

It is to be understood that the processor may be a Central Processing Unit (CPU), or another general-purpose processor, a Digital Signal Processor (DSP), an Application Specific Integrated Circuit (ASIC), etc. The general-purpose processor may be a microprocessor. Alternatively, the processor may be any routine processor, etc. The steps of the method disclosed in combination with the present disclosure may be directly embodied to be executed by a hardware processor or by a combination of hardware and software modules in the processor.

The memory may include a high-speed Random Access Memory (RAM), or may include a Non-Volatile Memory (NVM), such as at least one disk memory, or may be a U disk, a mobile hard disk, a Read-Only Memory, a magnetic disk, an optical disk, etc.

The bus may be an Industry Standard Architecture (ISA) bus, a Peripheral Component Interconnect (PCI) bus, an Extended Industry Standard Component (EISA) bus, etc. The bus may be divided into an address bus, a data bus, a control bus, etc. For ease of representation, the bus in the drawings of the present disclosure is not limited to one bus or one type of bus.

The storage medium may be implemented by a volatile or non-volatile storage device of any type or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk. The storage medium may be any available medium accessible for a general-purpose or special-purpose computer.

An exemplary storage medium is coupled to the processor, such that the processor may read information from the storage medium and write information into the storage medium. Certainly, the storage medium may be a component of the processor. The processor and the storage medium may be in an Application Specific Integrated Circuit (ASIC). Certainly, the processor and the storage medium may be in an electronic device or a master control device as discrete components.

It can be understood by those of ordinary skill in the art that all or part of the steps of each method embodiment may be completed by a program by instructing related hardware. The program may be stored in a computer-readable storage medium. The program is executed to execute the steps of each method embodiment. The storage medium includes various media capable of storing program codes, such as a ROM, a RAM, a magnetic disk, or an optical disk.

Embodiments of the present disclosure provide a location calibration method and device, which may effectively improve the location accuracy of a terminal device.

In a first aspect, an embodiment of the present disclosure provides a location calibration method, including:
  receiving, by a terminal device, location assistance message sent by a location server, where the location assistance message includes location calibration information;
  obtaining, by the terminal device, currently determined terminal location information, and determining a target location calibration value corresponding to the terminal device in the location calibration information according to the terminal location information; and
  calibrating, by the terminal device, the terminal location information according to the target location calibration value to obtain calibrated terminal location information.

In a possible implementation mode, the obtaining, by the terminal device, currently determined terminal location information includes:
  performing, by the terminal device, location measurement according to the location assistance message sent by the location server; and
  determining, by the terminal device, the terminal location information according to a location measurement result.

In a possible implementation mode, the location calibration information includes at least one piece of reference location information and a location calibration value corresponding to each piece of reference location information.

In a possible implementation mode, the determining a target location calibration value corresponding to the terminal device in the location calibration information according to the terminal location information includes:

determining target reference location information from the at least one piece of reference location information according to the terminal location information; and determining the location calibration value corresponding to the target reference location information as the target location calibration value corresponding to the terminal device.

In a possible implementation mode, the reference location information includes at least one of the following information: a location region and location configuration information.

In a possible implementation mode, each location region corresponds to one or more pieces of location configuration information.

In a possible implementation mode, each piece of reference location information includes a location region and a piece of location configuration information, and each piece of reference location information corresponds to a unique location calibration value.

In a possible implementation mode, the determining target reference location information from the at least one piece of reference location information according to the terminal location information includes:

determining, by the terminal device, a target location region where the terminal device is currently located according to the terminal location information;

determining, by the terminal device, target location configuration information according to a location configuration used for determining the terminal location information; and determining, by the terminal device, the target reference location information from the at least one piece of reference location information according to the target location region and the target location configuration information.

In a possible implementation mode, the location region is a location region of a preset length, a preset width, and a preset height.

In a possible implementation mode, the location configuration information includes a location method and/or a transmission and receiving point identifier.

In a second aspect, an embodiment of the present disclosure provides a location calibration apparatus, including:

a receiving module, configured to receive a location assistance message sent by a location server, where the location assistance message includes location calibration information;

a searching module, configured to obtain currently determined terminal location information, and determine a target location calibration value corresponding to a terminal device in the location calibration information according to the terminal location information; and a calibration module, configured to calibrate the terminal location information according to the target location calibration value to obtain calibrated terminal location information.

In a third aspect, an embodiment of the present disclosure provides a location calibration method, including:

sending, by a location server, location assistance message to a terminal device, where the location assistance message includes location calibration information, the location calibration information is used for the terminal device to determine a target location calibration value corresponding to the terminal device according to determined terminal location information and calibrate the terminal location information according to the target location calibration value to obtain calibrated terminal location information.

In a possible implementation mode, the location calibration information includes at least one piece of reference location information and a location calibration value corresponding to each piece of reference location information.

In a possible implementation mode, the reference location information includes at least one of the following information: a location region and location configuration information.

In a possible implementation mode, each location region corresponds to one or more pieces of location configuration information.

In a possible implementation mode, each piece of reference location information includes a location region and a piece of location configuration information, and each piece of reference location information corresponds to a unique location calibration value.

In a possible implementation mode, the location region is a location region of a preset length, a preset width, and a preset height.

In a possible implementation mode, the location configuration information includes a location method and/or a transmission and receiving point identifier.

In a fourth aspect, an embodiment of the present disclosure provides a terminal device, including at least one processor and a memory, where the memory stores a computer-executable instruction; and the at least one processor executes the computer-executable instruction stored in the memory to enable the at least one processor to execute the location calibration method as described in the first aspect.

In a fifth aspect, an embodiment of the present disclosure provides a computer-readable storage medium, storing a computer-executable instruction, a processor, when executing the computer-executable instruction, implements the location calibration method as described in the first aspect.

According to the location calibration method and device provided in the embodiments of the present disclosure, a terminal device receives a location assistance message sent by a location server, where the location assistance message includes location calibration information; and the terminal device determines a target location calibration value corresponding to the terminal device in the location calibration information according to currently determined terminal location information, and calibrates the currently determined terminal location information based on the target location calibration value. In the embodiments of the present disclosure, when the terminal device is located, the currently determined terminal location information of the terminal device is calibrated based on the location calibration information sent by the location server, whereby the location accuracy of the terminal device may be improved effectively.

It is finally to be noted that the above embodiments are used not to limit but only to describe the technical solutions of the present disclosure. Although the present disclosure is described with reference to each embodiment in detail, those of ordinary skill in the art should know that modifications may also be made to the technical solutions recorded in each embodiment or equivalent replacements may be made to part or all of technical features therein. These modifications or replacements do not make the essence of the corresponding technical solutions depart from the scope of the technical solutions of each embodiment of the present disclosure.

The invention claimed is:

1. A location calibration method, comprising:
receiving, by a terminal device, a location assistance message sent by a location server, wherein the location assistance message comprises location calibration information, and wherein the location calibration information comprises at least one piece of reference location information and a location calibration value corresponding to each piece of reference location information;
performing, by the terminal device, location measurement according to the location assistance message sent by the location server; and
determining, by the terminal device, terminal location information according to a location measurement result;
determining, by the terminal device, a target location region where the terminal device is currently located according to the terminal location information;
determining, by the terminal device, target location configuration information according to a location configuration used for determining the terminal location information;
determining, by the terminal device, the target reference location information from the at least one piece of reference location information according to the target location region and the target location configuration information; and
calibrating, by the terminal device, the terminal location information according to the target location calibration value corresponding to the target reference location information to obtain calibrated terminal location information;
wherein the reference location information comprises at least one of the following information: a location region and location configuration information, and wherein the location configuration information comprises at least one of a location method and a transmission and receiving point identifier.

2. The method of claim 1, wherein each location region corresponds to one or more pieces of location configuration information.

3. The method of claim 1, wherein each piece of reference location information comprises a location region and a piece of location configuration information, and each piece of reference location information corresponds to a unique location calibration value.

4. The method of claim 1, wherein the location region is a location region of a preset length, a preset width, and a preset height.

5. A location calibration method, comprising:
sending, by a location server, a location assistance message to a terminal device, wherein the location assistance message comprises location calibration information, and wherein the location calibration information comprises at least one piece of reference location information and a location calibration value corresponding to each piece of reference location information,
the location calibration information is used for the terminal device to determine a target location region where the terminal device is currently located according to terminal location information determined according to a location measurement result of location measurement performed according to the location assistance message, determine target location configuration information according to a location configuration used for determining the terminal location information, determine the target reference location information from the at least one piece of reference location information according to the target location region and the target location configuration information, and calibrate the terminal location information according to the target location calibration value corresponding to the target reference location information to obtain calibrated terminal location information;
wherein the reference location information comprises at least one of the following information: a location region and location configuration information, and wherein the location configuration information comprises at least one of a location method and a transmission and receiving point identifier.

6. The method of claim 5, wherein each location region corresponds to one or more pieces of location configuration information.

7. The method of claim 5, wherein each piece of reference location information comprises a location region and a piece of location configuration information, and each piece of reference location information corresponds to a unique location calibration value.

8. The method of claim 5, wherein the location region is a location region of a preset length, a preset width, and a preset height.

9. A terminal device, comprising at least one processor and a memory, wherein
the memory stores a computer-executable instruction; and
the at least one processor executes the computer-executable instruction stored in the memory to enable the at least one processor to:
receive a location assistance message sent by a location server, wherein the location assistance message comprises location calibration information, and wherein the location calibration information comprises at least one piece of reference location information and a location calibration value corresponding to each piece of reference location information;
perform location measurement according to the location assistance message sent by the location server;
determine terminal location information according to a location measurement result;
determine a target location region where the terminal device is currently located according to the terminal location information;
determine target location configuration information according to a location configuration used for determining the terminal location information;
determine the target reference location information from the at least one piece of reference location information according to the target location region and the target location configuration information; and
calibrate the terminal location information according to the target location calibration value corresponding to the target reference location information to obtain calibrated terminal location information;
wherein the reference location information comprises at least one of the following information: a location region and location configuration information, and wherein the location configuration information comprises at least one of a location method and a transmission and receiving point identifier.

* * * * *